United States Patent [19]

Gupta

[11] 4,321,499
[45] Mar. 23, 1982

[54] BRUSH TRACK LAMINATED PRINTED CIRCUIT MOTOR AND ARMATURE

[75] Inventor: Umesh C. Gupta, Hicksville, N.Y.

[73] Assignee: Kollmorgen Technologies Corporation, Dallas, Tex.

[21] Appl. No.: 126,010

[22] Filed: Feb. 29, 1980

[51] Int. Cl.³ .............................................. H02K 1/32
[52] U.S. Cl. ............................... 310/268; 310/DIG. 6
[58] Field of Search ........................... 310/DIG. 6, 268

[56] References Cited

U.S. PATENT DOCUMENTS

| | | | |
|---|---|---|---|
| 3,372,293 | 3/1968 | Henry-Baudot | 310/268 |
| 3,450,909 | 6/1969 | Burr | 310/268 X |
| 3,950,666 | 4/1976 | Lazaroiu et al. | 310/268 |

Primary Examiner—Donovan F. Duggan

Attorney, Agent, or Firm—Morgan, Finnegan, Pine, Foley & Lee

[57] ABSTRACT

An armature disc for an axial air-gap, direct current electric motor in which the armature consists of two half turn metal discs laminated to the opposite surfaces of an expoxy resin impregnated laminate disc with the half turn of the one disc joined to the mating half turn of the other disc at the mating surface at the disc I.D. and O.D. The resin disc extends from the I.D. of the half turn discs across the commutator area of the armature at the armature disc I.D. and terminates at or adjacent to the O.D. of such commutator area. The half turns outward of said O.D. may be air spaced or laminated to the opposite surfaces of an epoxy resin impregnated spacer disc.

7 Claims, 4 Drawing Figures

BRUSH TRACK LAMINATED PRINTED CIRCUIT MOTOR AND ARMATURE

This invention relates to disc armatures and, more particularly, to disc armatures for use in direct current electrical motors suited for numerous usages.

Axial air-gap, direct, current, electric motors are light in weight, compact and have found extensive use in the computer peripheral and automotive field such as for drives, electrical radiator cooling fans, electrically operated windows and the like. The armatures for such motors are conventionally stamped from copper or aluminum sheets, the stamping from each sheet providing the half or one side of the armature turns. The stampings are then laminated to the opposite sides of a mat or sheet leaving the ends of the half turns at the opposite sides of the mat or sheet extending inwardly at the I.D. and outwardly at the O.D. of the laminate. The mat or sheet may be thermoplastic or thermoset. The turn ends are joined, such as by welding, to complete the circuit at the inner end and the outer end of the half turns. A multiplicity of such stampings, with mats or sheets therebetween, may be laminated and the inwardly and outwardly projecting ends at the I.D. or O.D. of the laminates may be selectively joined to provide a multiturn coil. For most purposes, two stampings with a sheet laminated therebetween is sufficient while in certain other cases, depending on the application, four and more layer armatures will be preferable.

The mat or sheet, or prepreg as it is most often called, is a specially prepared woven cloth, usually of glass fibers, impregnated with an epoxy. The epoxy most commonly employed is of the heat setting type which has been partially cured prior to the application of the stampings and the heat laminating. The prepreg mat or sheet separates and supports the half turn metal stampings and properly positions and locates the stamping ends at the I.D. and O.D. while the ends are welded. Additionally, the prepreg mat, after lamination and curing, provides a backing for the commutator portion of the armature in the inner area of the laminated armature. Thus, a rigid backing is provided at the commutator and the brushes. This is, of course, of significant importance to the performance of the motor. Other mats or sheets of thermoplastic or thermosetting material or materials impregnated or coated therewith might also be employed.

One of the difficulties heretofore encountered in the use of axial air-gap motors having such laminated disc armatures in certain automotive applications is in the noise generated by such motors. Such noise, when audible in the passenger compartment, is objectionable and has detracted from the use of such motors for certain automotive uses.

It has been discovered, in the instant invention, that the noise level of laminated disc armatures for axial air-gap motors can be substantially reduced, the thermal dissipation of heat from the armature of such motors can be improved and the cost of such motors can be reduced by substantially reducing the area of the mat employed in the laminating of the half turn metal stampings. Such reduction in laminate mat area not only reduces cost but also reduces weight of the motor and the inertia of the armature.

In one embodiment of the invention, the laminate mat is limited to a disc extending from the I.D. of the armature of the O.D. of the commutator area. It has been discovered that such limited area of laminate disc provides sufficiently rigidity to the armature and spacing to the armature half turns formed by the opposing, laminated metal stampings. To avoid shorting between the half turns of the armature in the area out-board of the laminate disc area, the turns may be coated with a suitable insulator varnish coating such as the type conventionally used for wire coating.

In another embodiment of the invention, in addition to the laminate disc in the commutator area, a second narrow disc or ring of prepreg is positioned between the half turn metal stampings just inward of the O.D. of the armature where the ends of the half turns are welded. This outer disc or spacer disc just inward from the armature O.D. helps to hold and position the ends of the half turns for welding and, with the commutator laminate disc, acts as a spacer between the half turns and provides a gap therebetween in the unsupported area. In such arrangement, varnish coating or dipping of the assembled armature might be dispenses with.

The instant invention will be better understood from the following description of preferred embodiments taken with the appended drawings in which FIG. 1 is a plan view, with parts broken away, showing one embodiment of the invention;

Figure 1:
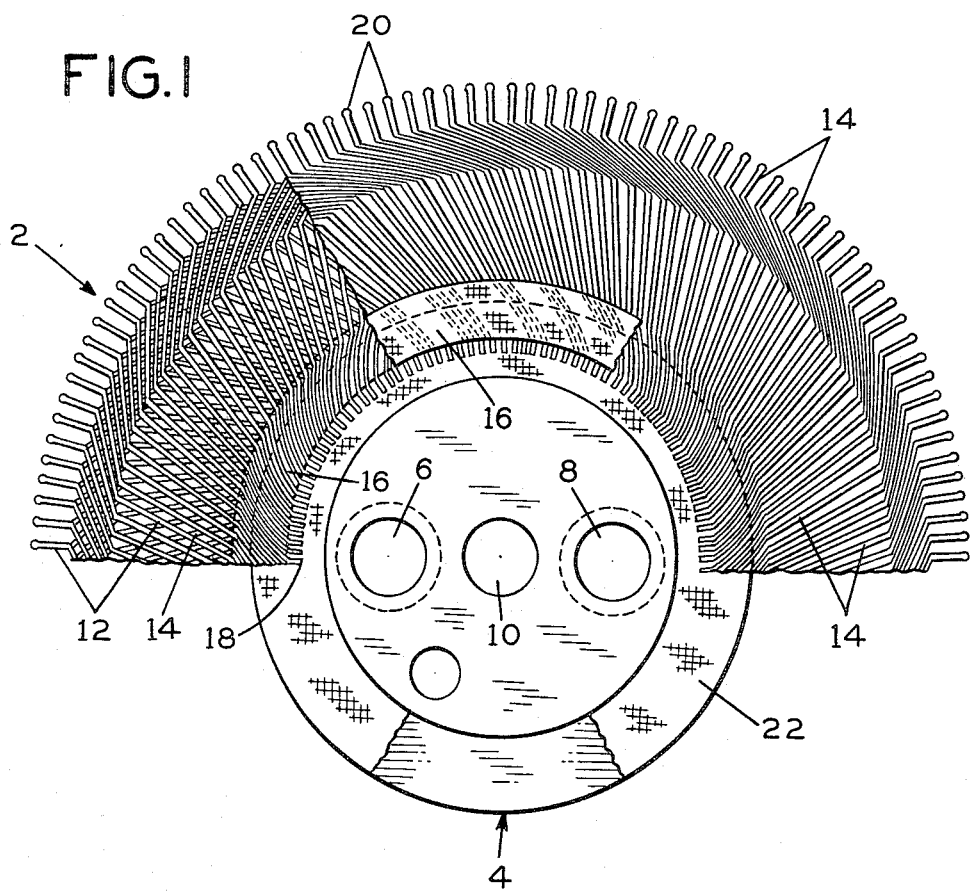
Figure 2:
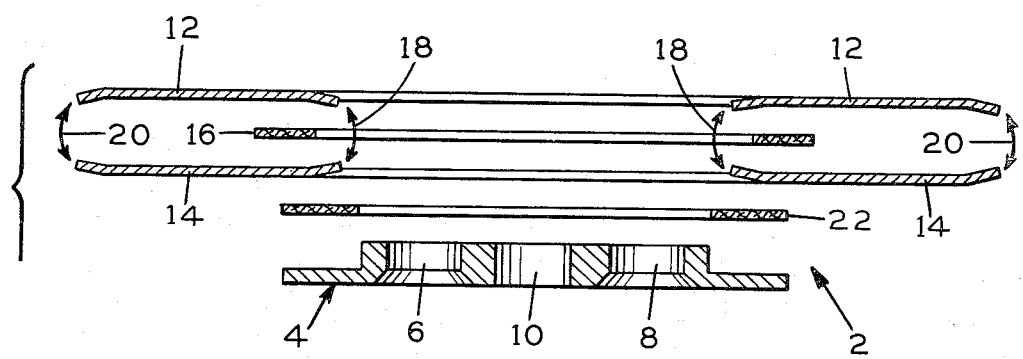
FIG. 2 is an exploded view, in section, of the embodiment of FIG. 1.

Referring to the drawings; particularly FIGS. 1 and 2, the armature, generally designated 2, has a hub 4 of, for example, metal or a strong plastic, provided with through holes 6, 8 and center hole 10 for connection to a motor shaft, not shown.

Metal half turns 12, 14, which may be stamped from metal sheets, such as in Knapp, et al., U.S. Pat. No. 3,382,570, dated May 14, 1968, are first bonded to the opposite surfaces of ring or spacer disc 16 such as of prepreg mat made up of a glass fiber base pre-impregnated with a heat curable epoxy resin and partially cured. The stamped sheets heat laminated adjacent their I.D. or center to the opposite surfaces of laminate disc 16, are then trimmed leaving bonded to the opposite sides of the mat or laminate disc 16 half turns 12, 14 with the half turns projecting outwardly beyond the O.D. disc 16. The inner ends of half turns 12, 14 at I.D. 18 and the outer ends of half turns 12, 14 at O.D. 20 are then joined to each other to interconnect the half turns ends and, through such interconnections, form the armature turns. With half turns 12,14 so bonded to the opposite surfaces of prepreg mat or laminate disc 16 and the ends joined, the armature might then be rotated through a varnish bath to coat the armature turns outboard of laminate disc 16 or the entire assembly might be dipped. In the latter event, after dipping and drying of the varnish, the exposed area of half turn 12 over mat 16, which will form the commutator after assembly, is polished to remove the varnish coating and expose the metal surface in the commutator area.

After half turns 12, 14 are bonded to the opposite surfaces of disc 16 and the ends of the turns are welded and joined, the assembly is then bonded to hub 4 with prepreg ring 22 also made up of a glass fiber base or woven cloth pre-impregnated with a partially cured heat curable epoxy resin.

Figure 3:
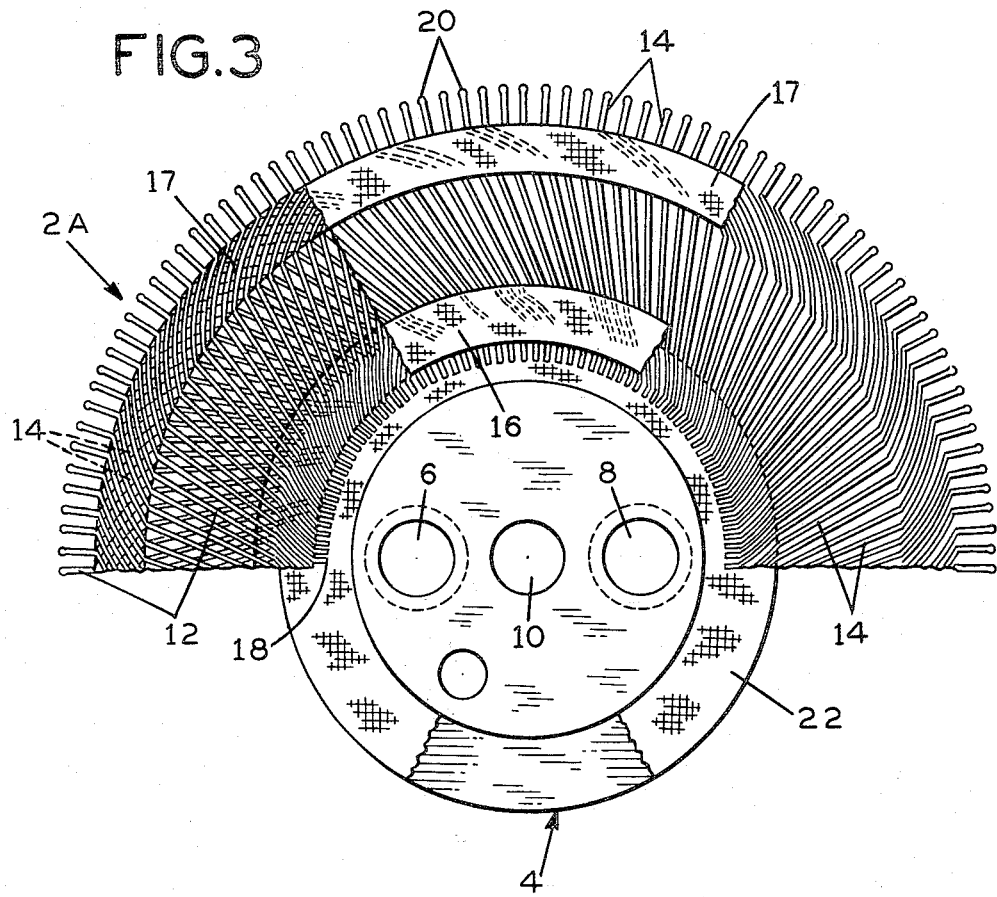
FIG. 3 is a plan view, with parts broken away, similar to FIG. 1 but showing a second embodiment of the invention.
Figure 4:
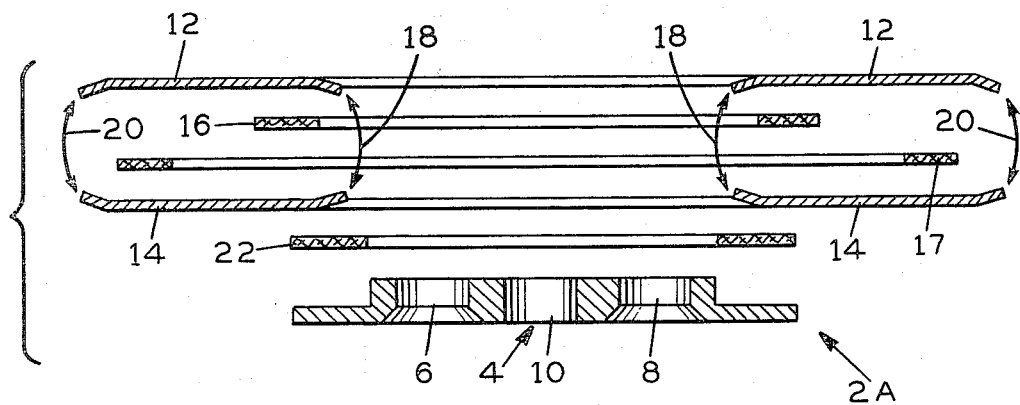
FIG. 4 is an exploded view, in section, of the embodiment of FIG. 3.

The embodiment of FIGS. 3 and 4 is substantially the same as the embodiment of FIGS. 1 and 2 described above except that, in addition to the prepreg mat or laminate disc 16 forming a reinforcing and stiffening ring between the half turns 12, 14 underlying the commutator area, a second mat or spacer disc 17, such as of prepreg mat or glass fiber fabric, is positioned between half turns 12, 14 adjacent the O.D. of the turns or armature and bonded or fused to ring 17 at the same time the turns are heat bonded or fused to prepreg mat 16. The coating of the turns with an insulating varnish, such as in the embodiment of FIGS. 1 and 2, might be dispensed with through the use of the spacer disc 17 in the embodiment of FIGS. 3 and 4.

In both embodiments of the invention shown and described, the ring or disc laminating the turns and backing up the armature in the commutator area is terminated at or near the outer margin of such area. Thus, stiffness and mass provided by such disc is limited to such area. This limits and reduces the transmission of brush vibrations and brush noise and the amplification and resonance of such vibrations and noise. Air is permitted to flow through the armature beyond the commutator area and cool the armature at the same time helping to dissipate the heat generated in the armature.

The cost, weight and inertia of the armature are also reduced.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. An armature disc for axial air-gap, direct current electric motor, said armature disc including a plurality of half turn stamped metal discs, stacked one on the other, the half turns of said metal discs being interconnected and joined at the I.D. and O.D. of said armature disc and forming the turns of said armature, said metal discs being laminated to the opposite surfaces of a laminate disc extending between said metal discs adjacent the I.D. of said armature disc and forming in an area on said laminated metal discs adjacent said I.D. a commutator ring, said armature turns extending radially outwardly beyond said commutator area from the marginal outer edge of said laminate disc.

2. An armature disc, as recited in claim 1, in which said turns in said half turn stamped metal discs extending radially outwardly beyond the marginal outer edge of said laminate disc are coated with an insulator varnish.

3. An armature, as recited in claim 1, in which said armature disc includes a spacer disc forming a ring adjacent the O.D. of said armature and spaced radially outwardly from the outer marginal edge of said laminate disc.

4. An armature, as recited in claim 3, in which said half turns are unsupported between said spacer and laminate discs.

5. An armature, as recited in claim 3, in which the section of said half turns intermediate said laminate disc and said spacer disc are unsupported by said discs and are coated with an insulator varnish.

6. An armature, as recited in claims 1, 2, 3, 4 or 5 in which said laminate disc is impregnated with epoxy resin.

7. An armature, as recited in claims 3, 4 or 5 in which said laminate disc and said spacer disc are impregnated with epoxy resin.

* * * * *